United States Patent [19]
Morgan

[11] 4,119,372
[45] Oct. 10, 1978

[54] MICROFICHE INSPECTION APPARATUS
[75] Inventor: Robert Anthony Morgan, Palo Alto, Calif.
[73] Assignee: Terminal Data Corporation, Woodland Hills, Calif.
[21] Appl. No.: 725,825
[22] Filed: Sep. 23, 1976
[51] Int. Cl.² .............................................. G03B 21/22
[52] U.S. Cl. .................................. 353/26 R; 353/101; 353/76
[58] Field of Search ............. 353/101, 39, 26 R, 26 A, 353/27 R, 27 A, 76, 22–24; 352/142, 129, 136; 355/55–57; 350/38, 183, 87

[56] References Cited

U.S. PATENT DOCUMENTS

| | | | |
|---|---|---|---|
| 2,313,639 | 3/1943 | Hauser | 353/39 |
| 2,344,263 | 3/1944 | Perkins | 350/183 X |
| 2,878,718 | 3/1959 | Post | 353/76 |
| 3,604,793 | 9/1971 | Wangerin et al. | 353/26 A |
| 3,809,460 | 5/1974 | Lettan | 353/39 |
| 3,888,576 | 6/1975 | Bolgar et al. | 353/76 |
| 3,926,513 | 12/1975 | Silver | 353/26 R |

FOREIGN PATENT DOCUMENTS 558,315  12/1943  United Kingdom ...................... 353/77

*Primary Examiner*—Harry N. Haroian
*Attorney, Agent, or Firm*—Harry R. Lubcke

[57] ABSTRACT

A microfiche viewer structured for examining new microfiche film. The film is typically still in roll form as it comes from the microfiche camera. Plural magnifications of the microfiche image are selectively available; one, to reproduce a whole fiche upon the viewing screen for general observation of photographic quality, the other, to reproduce perhaps four frames of a whole microfiche for detailed observation of quality. The apparatus is structured for convenience in viewing. The different magnifications are obtained by selectively interposing objective lenses of different focal length in the light path adjacent to the microfiche film on the side opposite to that occupied by a light source. Motor driven film transport means are provided atop the apparatus proper.

8 Claims, 6 Drawing Figures

MICROFICHE INSPECTION APPARATUS

BACKGROUND OF THE INVENTION

This invention pertains to optical viewers for microfiche.

Microfiche viewers of single frames are known to the art. Except for making a hard copy from microfiche, such a viewer is required to present a transient optical image at substantially the size of the original document to one who wishes to read the information involved.

In simple terms, microfiche viewers may be considered as a "magic lantern" slide projector of antiquity with the addition of a built-in screen.

However, today sophisticated microfiche film-positioning means are required to successively present single frames from the microfiche. An over-view of the whole fiche is not desired.

The art has made provision for infrequently altering the magnification of viewers. This has been for the purpose of properly reproducing fiche that were originally optically reduced by specific ratios, such as 24 or 48. Alteration has usually required removing one objective lens and replacing it with another of different focal length.

SUMMARY OF THE INVENTION

Microfiche inspection apparatus requires means to rapidly and all-conveniently accomplish an in-focus change of the magnification of the reproduction from a low value that allows cursory inspection of the whole microfiche to a high value for detailed inspection of one or a very few frames to detect small imperfections. Also, means to rapidly and conveniently transport the film from one end of the roll to the other are desirable. Such means are provided.

A lever system for each objective lens that is simultaneously actuated by a single manual control conveniently mounted on the side or the front of the over-all enclosure is provided.

Auxiliary condensing lenses to provide full-field illumination of a whole fiche for the reproduction thereof, or of only a very few frames for the reproduction thereof may also preferably be linked to the same lever system.

A pair of electric motors provide transport for the reel of fiche film from one end to the other. Manual or automatic control is available.

A transparent platen that automatically opens whenever the film is moved is also provided.

DESCRIPTION OF THE PREFERRED EMBODIMENT

Figure 1:
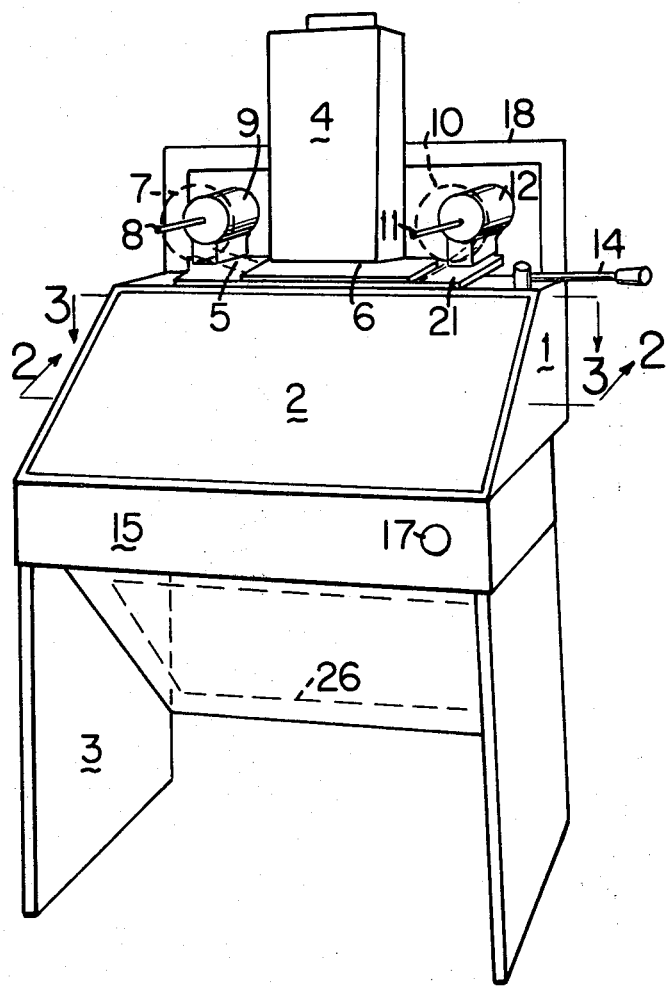
FIG. 1 is a front perspective external view of the apparatus.

In FIG. 1 numeral 1 indicates an enclosure which houses the major portion of the optical system of the device of this invention. It is preferably light-tight. A viewing screen 2 is inclined at an angle to the vertical for convenient viewing by an operator at the front of the enclosure. The screen is translucent, since the image is impressed upon it from the rear. The screen may have a gray tone to provide the best contrast in the image in the presence of ambient light. One suitable material for the screen is glass, frosted, and having optically directional characteristics to direct the light forward to the operator. A thickness of 4 mm is appropriate. The screen may be any size, but a height of 56 cm and a width of 84 cm is typical.

A lower support 3 positions enclosure 1 at a height where an operator standing or seated upon a stool is positioned to conveniently view screen 2.

A lamphouse 4 centrally surmounts enclosure 1. At the top it contains a high intensity light source, typically incandescent, while below it contains a selectable plurality of condensing lenses.

The microfiche film 5 to be examined is positioned directly beneath the lamphouse. The film may be a single microfiche, having the usual size of 15 cm wide by 10.5 cm high, but more frequently it is a whole roll of microfiches. These are usually exposed in a camera and processed on a strip 15 cm wide by 120 meters maximum length.

An upper transparent platen 6 is disposed above film 5 and can be raised, while lower transparent platen 16 is fixed. See FIGS. 2 and 6.

When the microfiche are in roll form the film is typically wound on a reel 7, which is mounted on a spindle 8. The latter may also be the shaft of a controllable slow speed motor 9. Alternately, a small d.c. motor having a pinion and a separate shaft for spindle 8 with a gear and a toothed belt between the two may be employed. A spped reduction ratio of ten to one is suitable.

A take-up reel 10, upon shaft 11 of motor 12 or the alternate structure mentioned, is disposed on the opposite side of lamphouse 4 from the prior assembly in a complementary structure for reeling the roll of microfiche film after it has been optically inspected. Both motors are reversible, so any desired back-and-forth translation of the microfiche film is possible.

As will be later detailed, a change in objective lenses accomplishes the change in magnification for alternate inspection purposes as previously mentioned. This is accomplished by the operator swinging handle 14 about 90° in one embodiment. Alternately, an equivalent linkage that is activated by a knob that is mounted on the front control panel 15 may be used.

In any event, a separate image focus knob 17 is mounted on the right side of the control panel.

Frame 18, at the rear of the upper part of enclosure 1 supports elements within lamphouse 4.

Figure 2:
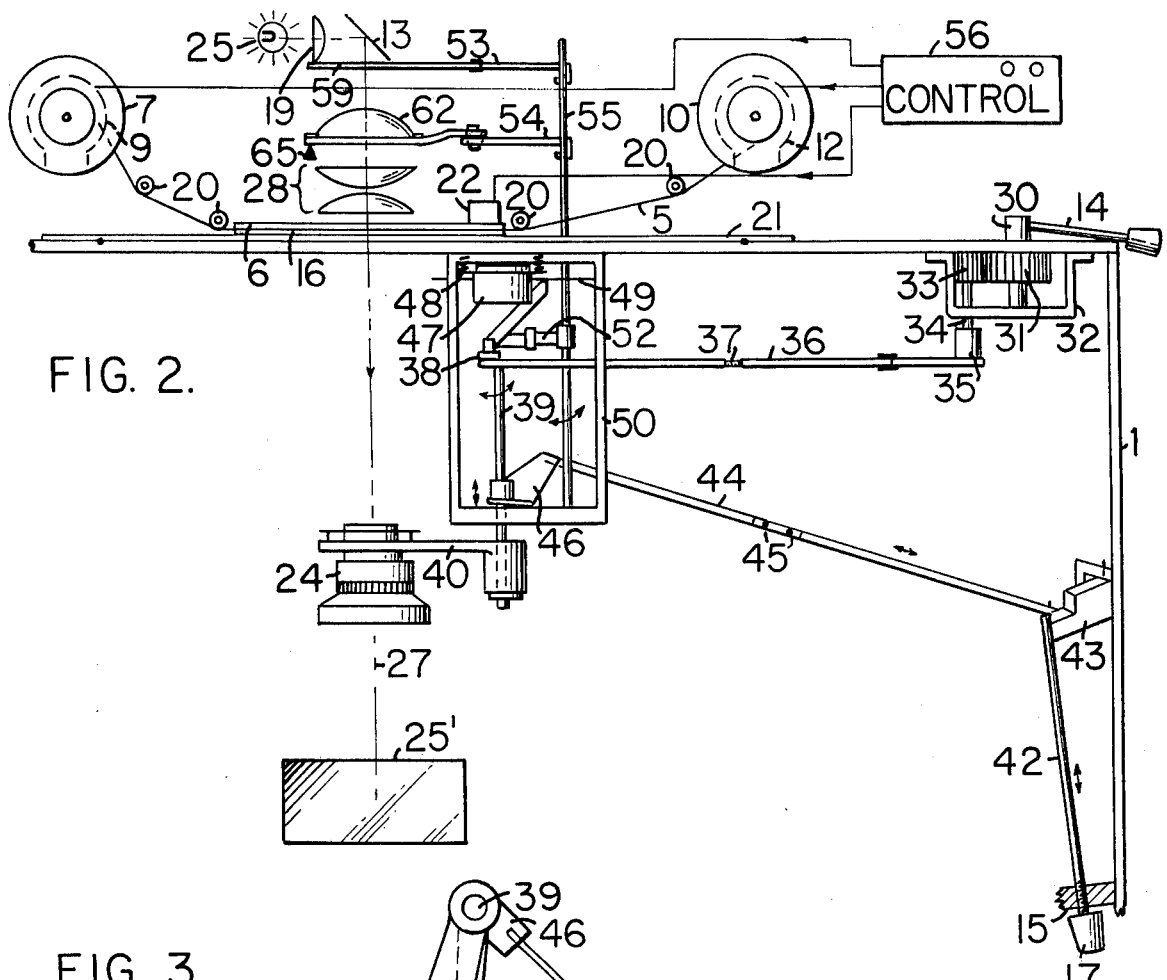
FIG. 2 is a front elevation view of the interior of the apparatus along section line 2—2 of FIG. 1.

In FIG. 2 the path of microfiche film 5 is shown as chiefly defined by reels 7 and 10, rollers 20, upper platen 6, and lower platen 16. All of these elements are mounted on a table 21, which in turn is supported by a plurality of ball bearings also bearing upon the top surface of enclosure 1. By manual manipulation this allows any frame of the microfiche to be positioned in the optical path for reproduction on screen 2. The motion of the table is horizontally, transverse of the optical axis.

An electro-actuator 22 provides the mechanical force for raising upper platen 6 when film 5 is translated; thereby to prevent scratching when the film is in motion. When the film is stationary the two transparent platens are together, to provide a flat microfiche film at a fixed focal position along the optical path. Constantly in-focus reproduction of the microfiche image regardless of the magnification utilized and regardless of subsidiary factors is highly desirable and the structure of this invention contributes to this.

In FIG. 2 long focal length lens 24 is shown in the optical path. This path originates with source of light 25, passes through condensing lens system 19, 62, 38, film 5, objective lens 24, small inclined mirror 25', large inclined mirror 26, and screen 2. The latter two elements are to be seen in FIG. 1. The axis of the optical path is shown by dashed line 27 in FIG. 2. Preliminary mirror 13 deflects the illumination 90°.

An important part of the inspection apparatus is a precision means for selectively entering lenses of different focal length into the optical path. Swinging handle 14 rotates shaft 30 when the handle is moved in an arc. About 90° rotation is typical. Gear 31 is fastened to shaft 30, the latter being journaled in "U" mounting 32. Pinion 33 meshes with gear 31 a provides about a two-to-one step-up in speed of rotation. Pinion 33 is fastened upon shaft 34, which is also journaled in mounting 32.

Shaft 34 turns 180° and "detents" into position because clamps 29 & 29'are spring loaded by tension spring 51 to clamp onto the flattened portion of the shaft each time it rotates 180°.

Figure 3:
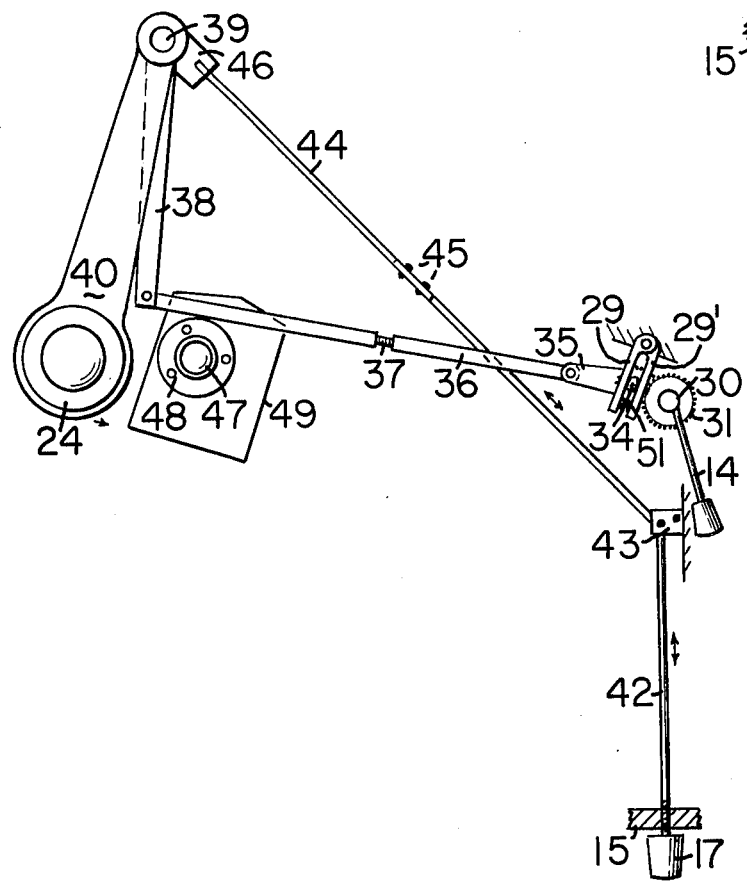
FIG. 3 is a top plan view of the same along line 3—3 of FIG. 1, showing the levers for the objective lenses.

Arm 35 is rigidly attached to shaft 34. In FIG. 3 it is shown at top dead center, which is one position where it stops because of the clamping action on shaft 34. It also stops at bottom dead center.

The mass of the lenses 24 and 27 is slowed-down at the ends of the travel involved in changing the magnification of the apparatus by the simple harmonic motion of arm 35. The elastic bounce-back of the mass of the lenses does not rotate shaft 34 flats out of clamp 29 & 29' because of this dead center configuration. The same situation obtains 180° removed when arm 35 is at bottom dead center.

Arm 35 is connected to and actuates rod 36. Rod 36 has stud 37 centrally located along the length thereof. This allows adjustment of the length of the rod upon disconnection of one end thereof and rotation of one part with respect to the other. Such adjustment insures that the objective lenses shall be accurately transversely centered upon optical axis 27.

Rod 36 is pivotally attached to arm 38, which in turn is attached to shaft 39. Arm 40 is also attached to shaft 39 at the lower extremity thereof and carries long focal-length lens 24 at its cantilevered extremity. Various optical parameters may be selected for embodiments of this invention. However, a magnification of 44 times is a desirable parameter when lens 24 is employed. This is accomplished by employing a lens having a focal length of the order of 200 mm and an aperture of 5.6, located approximately 20 cm below film 5.

Lens 24 is focused from the front panel by turning knob 17. This knob is attached to rod 42, the forward portion of which is threaded and revolves in internal threads in front panel 15. Rod 42 is thus translated axially as well as being rotated when knob 17 is turned. Rod 42 is terminated at arm 43, where incremental swinging of that arm occurs upon the rotation of rod 42. This results in axial translation of rod 44, which is provided with length adjustment by telescoping under the control of fasteners 45.

Lever 46 is provided with a fulcrum intermediate the attachment of rod 44 thereto, while the other end of lever 46 translates shaft 39 vertically. This translation accordingly translated lens 24 along optical path 27 and thus alters the focus of the image of the microfiche upon screen 2. In-focus adjustment is thus possible.

Wide-angle lens 47 is positioned vertically within approximately 15 mm of film 5. The lens is provided with a floating spring mount. Springs 48 urge the lens mount upward against lower platen 16. This insures in-focus performance of this lens without the need for adjustment by the operator. The lens may have a focal length of 35 mm.

A black planar light baffle 49 is attached to the structure of lens 47 and moves horizontally with it. The baffle prevents spurious light from the initial part of the optical system from impinging upon mirror 25' and thereby causing spurious illumination and loss of contrast in the reproduced image on screen 2.

Shaft 39 and related elements are journaled or supported by frame 50, which may be a casting.

For the high magnification mode of operation greater convergence of the light beam by the condensing lens system is desirable. Two additional condensing lenses are thus inserted in the condensing part of the optical system.

This is mechanically accomplished by arm 52, which is attached to shaft 55. Upon an upward prolongation of this shaft a pair of horizontal arms 53 and 54 carry additional condensing lenses for insertion into the optical path when lens 47 is used. An additional heat-absorbing glass (not shown), may also be inserted directly in front of illuminating lamp 25.

Figure 4:
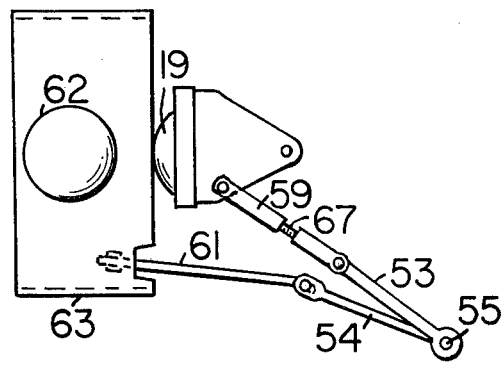
FIG. 4 is a fragmentary plan view of an in-out condensing lens arrangement.

As shown in FIG. 4, arm 53 and its prolongation 59 are in line when lens 19 is in optical-use position. It is not necessary that shaft 55 stop in a precise position because the position of lens 19 is not sensitive to small changes in the angular relationship of arms 53 and 59.

Although this angular relationship is not important, the combined lengths of arms 53 and 59 is important. Accordingly, adjusting stud 67 is provided at the center of arm 59. This is the same structure as adjusting stud 37 in prior arm 36.

Figure 5:
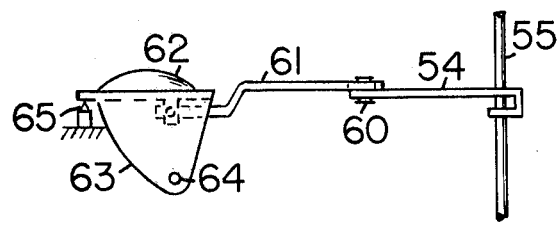
FIG. 5 is a fragmentary elevation view of the horizontal lens of the in-out condensing lens arrangement.

The positioning of the horizontally disposed additional condensing lens 62 is shown in elevation in FIG. 5. Pin 60 is loose in its hole. The weight of lens 62 causes bracket 63 to pivot about stud 64 under the influence of gravity until lens-carrying bracket 63 comes to rest against adjustable stop 65, which is supported by the main frame of the device. Again, the rotational position at which shaft 55 comes to rest is not critical. Arm 61 is the prolongation of arm 54.

Figure 6:
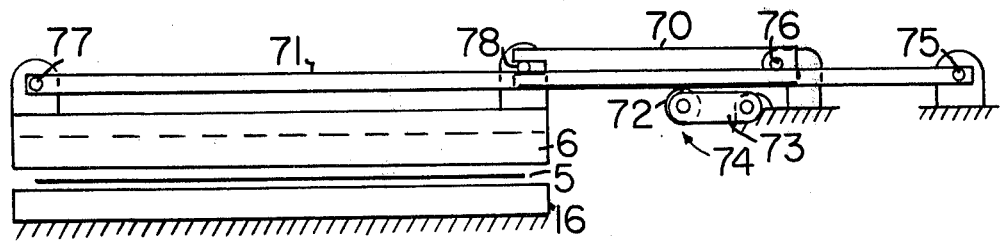
FIG. 6 is a fragmentary elevation view of the transparent platen and actuating linkage.

The previously mentioned platen 6, 16, is detailed in FIG. 6.

The top transparent glass member 6 lifts vertically upward without rocking by virtue of the structure provided. Proper optical design does not provide a large vertical space for this lifting, and so a straight-up movement provides the largest platen-open space, with the smallest probability of scratching the microfiche film when it is translated from one fiche to the next, or when it is translated a distance occupied by many fiches to exhibit a particular one.

The rectilinear motion achieved also prevents abrasion of the film when the upper member is lowered down upon the film to perform the film-straightening platen function.

Short arm 70 in FIG. 6 lifts the rear of the upper platen 6 and long arm 71 lifts the front of the upper platen. The arms are both raised by roller 72. Normally, the structure shown in FIG. 6 is duplicated directly behind it, so that the upper platen is lifted at its four corners. Roller 72 is raised when arm 73 rotates, as shown by arrow 74. The pivots for these arms, i.e., stationary fulcrum points 75 and 76, are at a distance from roller 72 in each case the same fraction as the distances from the roller to the lifting points 77 and 78; thus the lifting points each move upward the same amount.

Upon the manipulation of suitable push-buttons that are provided electrical control 56 exercises forward and reverse rotational control of motors 9 and 12. Appropriate reeling of film 5 can thus be accomplished. Typically, this is arranged with a forward rotation of one motor with a reverse rotation on the other motor, with joint control of the motors to insure even translation of the film.

Similarly, a connection from electrical control 56 to actuator 22 energizes the same when either or both of the motors are energized, to lift platen 6. The reverse is also true. Thus, possible scratching of the film is automatically prevented and the microfiche is automatically clamped by the platen when the film is stationary, thus being is focus.

I claim:

1. A microfiche inspection apparatus, comprising;
   (a) an enclosure (1),
   (b) a viewing screen (2) disposed at an angle to the vertical at the front of said enclosure,
   (c) illumination means (4) surmounting said enclosure and having a downward light path (27),
   (d) microfiche transport means (9, 12) also surmounting said enclosure, to position microfiche (5) in said light path,
   (e) plural objective lenses (24, 47) having significantly differing characteristics,
   (f) bi-position, detented, plural, rigid arm means (35, 36, 38) to selectively rotate and align one of said objective lenses at a time into said light path at significantly different locations along said light path to form an image of a selected portion of said microfiche upon said viewing screen at significantly different magnifications,
   (g) a first selectively positionable condensing lens (19) within said illumination means, and
   (h) first jointed auxiliary lever means (53, 59) connected to said first condensing lens and to said detent arm means (36, 55)
   to position the same in said light path selectively according to the positioning of said detented arm means.

2. The apparatus of claim 1, which additionally includes;
   (a) a second selectively positionable condensing lens (62) spaced from said first condensing lens (19) within said illumination means,
   (b) second jointed auxiliary lever means (54, 61) connected to said second condensing lens and to said detent arm means (36, 55)
   to position the same in said light path selectively according to the positioning of said detented arm means concurrently with the positioning of said first condensing lens in said light path, and
   (c) a mechanical stop (65) to determine the horizontal position of said second condensing lens when it is in said light path.

3. The apparatus of claim 1, in which;
   (a) said first jointed auxiliary lever means (53, 59) has a length-adjusting means (67),
   whereby said first condensing lens is accurately selectively transversely positioned in said light path (27).

4. The apparatus of claim 2, in which;
   (a) said second jointed auxiliary lever means (54, 61) has a loose pin connection (60),
   whereby said second condensing lens is selectively positioned against said mechanical stop (65) by gravity.

5. A microfiche inspection apparatus, comprising;
   (a) an enclosure (1),
   (b) a viewing screen (2) disposed at an angle to the vertical at the front of said enclosure,
   (c) illumination means (4) surmounting said enclosure and having a downward light path (27),
   (d) microfiche transport means (9, 12) also surmounting said enclosure, to position microfiche (5) in said light path,
   said microfiche transport means being comprised of;
      (1) supply reel means (7) having an electric motor (9),
      (2) takeup reel means (10) having an electric motor (12),
      (3) platen means (6, 16) having an actuator (22) with a stub arm (73) mechanically contacting short (70) and long arms (71) that are spacedly attached to said platen means for rectilinearly opening said platen means,
      (4) logic means (56) having a connection to each said electric motor and to said actuator,
      said logic means constituted to reel microfiche film in both forward and reverse directions by controlling said motors and to actuate said platen means to the open position when either of said electric motors operate,
   (e) plural objective lenses (24, 47) having significantly differing characteristics, and
   (f) bi-position, detented, plural, rigid arm means (35, 36, 38) to selectively rotate and align one of said objective lenses at a time into said light path at significantly different locations along said light path to form an image of a selected portion of said microfiche upon said viewing screen at significantly different magnifications.

6. A microfiche inspection apparatus, comprising;
   (a) an enclosure (1),
   (b) a viewing screen (2) disposed at an angle to the vertical at the front of said enclosure,
   (c) illumination means (4) surmounting said enclosure and having a downward light path (27),
   (d) microfiche transport means (9, 12) also surmounting said enclosure, to position microfiche (5) in said light path,
   (e) plural objective lenses (24, 47) having significantly differing characteristics,
   (f) bi-position, detented, plural, rigid arm means (35, 36, 38) to selectively rotate and align one of said objective lenses at a time into said light path at significantly different locations along said light path to form an image of a selected portion of said microfiche upon said viewing screen at significantly different magnifications, said detented arm means (35, 36, 38) being comprised of;
- (1) a plural position manual control (14, 30) having a detented shaft (34),
- (2) resilient clamp means (29) bearing upon said detented shaft,
- (3) a crank (35) attached to said detented shaft and to said detented arm means, and
- (4) plural levers (38, 40), each attached to said detented arm and to a said objective lens, said levers proportioned to selectively transversely position a said objective lens in said light path according to the rest positions of said detented shaft.

7. A microfiche inspection apparatus, comprising;
(a) an enclosure (1)
(b) a viewing screen (2) disposed at an angle to the vertical at the front of said enclosure,
(c) illumination means (4) surmounting said enclosure and having a downward light path (27),
(d) microfiche transport means (9, 12) also surmounting said enclosure, to position microfiche (5) in said light path,
(e) plural objective lenses (24, 47) having significantly differing characteristics,
(f) bi-position, detented, plural, rigid arm means (35, 36, 38) to selectively rotate and align one of said objective lenses at a time into said light path at significantly different locations along said light path to form an image of a selected portion of said microfiche upon said viewing screen at significantly different magnifications,
(g) a lower stationary transparent platen (16) disposed below said microfiche (5),
(h) an upper movable transparent platen (6) having forward and rear lifting points (77, 78),
(i) forward (71) and rear (70) lifting arms of unequal length having cantilever disposed fulcrums (75, 76) and attachment to respective forward and rear lifting points, and
(j) lifting means (72) engaging both said forward and rear lifting arms, spaced from said fulcrums proportionally according to the lengths of said lifting arms whereby said upper platen is lifted with uniform spacing from said lower platen throughout the upward excursion.

8. A microfiche inspection apparatus, comprising;
(a) an enclosure (1),
(b) a viewing screen (2) disposed at an angle to the vertical at the front of said enclosure,
(c) illumination means (4) surmounting said enclosure and having a downward light path (27),
(d) microfiche transport means (9, 12) also surmounting said enclosure, to position microfiche (5) in said light path,
(e) plural objective lenses (24, 47) having significantly differing characteristics,
(f) bi-position, detented, plural, rigid arm means (35, 36, 38) to selectively rotate and align one of said objective lenses at a time into said light path at significantly different locations along said light path to form an image of a selected portion of said microfiche upon said viewing screen at significantly different magnifications, and
(g) means to focus a said objective lens (24) being comprised of;
- (1) an axially translatable mounting (39) for only said objective lens,
- (2) a lever engaging said axially translatable mounting to axially translate said mounting,
- (3) a rod (44) attached to said lever away from the engagement of said lever and said axially translatable mounting, to move said lever,
- (4) a swing arm (43) attached to said rod to axially translate said rod, and
- (5) a further rod (42) attached to said swing arm to rotatively swing said swing arm, the focus elements connected to axially move said objective lens (24) for focusing upon said further rod being actuated.

* * * * *